United States Patent [19]

McPherson et al.

[11] Patent Number: 4,698,769

[45] Date of Patent: Oct. 6, 1987

[54] SUPERVISORY AUDIO TONE DETECTION IN A RADIO CHANNEL

[75] Inventors: Ross McPherson, Denville; Kenneth F. Smolik, Morristown; David J. Thomson, Murray Hill, all of N.J.

[73] Assignees: American Telephone and Telegraph Company, New York, N.Y.; Bell Telephone Laboratories, Incorporated, Murray Hill, N.J.

[21] Appl. No.: 698,095

[22] Filed: Feb. 4, 1985

[51] Int. Cl.[4] ............................................. G06F 7/38
[52] U.S. Cl. .................................... 364/724; 364/726
[58] Field of Search ...................... 364/724, 726, 733; 375/100; 370/110.3; 328/167

[56] References Cited

U.S. PATENT DOCUMENTS

| | | | |
|---|---|---|---|
| 3,803,391 | 4/1974 | Vernet | 364/726 |
| 4,021,653 | 5/1977 | Sharp et al. | 364/724 |
| 4,025,853 | 5/1977 | Addeo | 325/55 |
| 4,075,630 | 2/1978 | Shapiro et al. | 364/726 |
| 4,266,279 | 5/1981 | Hines | 364/726 |
| 4,302,817 | 11/1981 | Labedz | 364/724 |
| 4,519,084 | 5/1985 | Langseth | 364/724 |
| 4,534,043 | 8/1985 | Krishnan | 364/724 |
| 4,535,417 | 8/1985 | Peacock | 364/724 |
| 4,623,980 | 11/1986 | Vary | 364/724 |

Primary Examiner—Gary V. Harcom
Assistant Examiner—Long Thanh Nguyen
Attorney, Agent, or Firm—Patrick E. Roberts; John A. Caccuro

[57] ABSTRACT

Supervisory audio tones received from a mobile telephone unit are converted from analog to digital form. The tone is then converted to a complex number by bifurcating the tone path and multiplying one path by a sine function and the other path by a cosine function. The complex numbers are accumulated and the frequencies where significant power exists is found using the discrete Fourier transform. If the power at an assigned frequency exceeds a threshold, the corresponding supervisory audio tone is declared to have been detected.

8 Claims, 10 Drawing Figures

FROM FIG. 6

DFT

$FR(0) = x(0) + x(1) + x(2) + x(3) + x(4) + x(5) + x(6) + x(7)$ $FI(0) = y(0) + y(1) + y(2) + y(3) + y(4) + y(5) + y(6) + y(7)$ $FR(2) = x(0) + y(1) - x(2) - y(3) + x(4) + y(5) - x(6) - y(7)$ $FI(2) = y(0) - x(1) - y(2) + x(3) + y(4) - x(5) - y(6) + x(7)$ $FR(6) = x(0) - y(1) - x(2) + y(3) + x(4) - y(5) - x(6) + y(7)$ $FI(6) = y(0) + x(1) - y(2) - x(3) + y(4) + x(5) - y(6) - x(7)$

NOTE: A SET OF FOURIER COEFFICIENTS IS ASSOCIATED WITH EACH ANTENNA FACE.

|FR(0)| + |FI(0)| > THRESHOLD

NO / YES

SAT₁ PRESENT

| NOTES: |
| --- |
| ANTENNA SEQUENCE: |
| 1) omni, alpha, beta, gamma |
| 2) For each antenna face, the discrete fourier transform is determined and compared to a predetermined threshold. |
| 3) SAT 1 = 6000Hz<br>SAT 2 = 5970Hz<br>SAT 3 = 6030Hz |

SUPERVISORY AUDIO TONE DETECTION IN A RADIO CHANNEL

TECHNICAL FIELD

This invention relates to cellular mobile radio telephone systems and, in particular, to rapid and reliable detection of audio control tones in the presence of severe signal-to-noise conditions.

BACKGROUND OF THE INVENTION

Volume 58, number 1 of *The Bell System Technical Journal*, published in January 1979 by the American Telephone and Telegraph Company, discloses through several articles therein the Advanced Mobile Phone Service, a cellular mobile radio telephone system. At page 23 therein, it is stated that when a system is first installed, cell sites are omnidirectional in the horizontal plane. As initial systems grow into mature systems, however, omnidirectional antennas will be augmented by three 120-degree sector antennas called alpha, beta and gamma: each voice channel in a cell site being transmitted and received over one of the three antennas.

As stated at page 47 of the aforesaid Journal, supervision is the process of detecting customer intiated changes in the switch-hook state of a telephone. In order to avoid false supervision caused by co-channel interference, from the reuse of channels, the aforesaid cellular system uses a combination of a signaling tone (ST) burst and a continuous out-of-band, supervisory audio tone (SAT). Three SAT's are set aside at 5970, 6000, and 6030 Hz; any one is used at a given cell site. A mobile unit receives a SAT from a cell site and returns it to the cell site. It is important for the cell site to compute reliably the SAT returned from the mobile unit within a predetermined period. This invention teaches the rapid and accurate computation of the SAT from a variety of sources concurrently.

SUMMARY OF THE INVENTION

In accordance with the illustrative embodiment of the present invention, if a received supervisory audio tone (SAT) associated with a channel in a cellular mobile radio system is above a threshold, then a decoder confirms detection of the corresponding SAT. More particularly, the SAT which is received from a mobile unit is converted from analog to digital form and appropriately limited for noise immunity. The SAT is bifurcated into two paths. The tone in one path is multiplied by a cosine function of time to derive the real component of a complex number and the tone in the other path is multiplied by a sine function to derive the imaginary component of the complex number. A series of the real components of the generated complex numbers is accumulated in an inphase data accumulator and the corresponding imaginary components of the complex numbers are accumulated in a (quad) quadrature phase accumulator. By combining the real and imaginary components and performing a discrete Fourier transform (DFT) on the complex numbers, the power of the received signal at the frequencies of interest is found rapidly and within a predetermined period. The value at the assigned SAT frequency is then compared with a threshold. If the threshold is exceeded, the SAT at the given frequency is delcared to have been detected.

An advantage of the present invention is that it provides reliable detection of SAT in a fading channel. The prior art typically relied on phase lock loops which become unlocked during fades or other types of signal interruption. Similarly, methods based on analog filters were excessively sensitive to tolerances and the like in view of the excessively high selectively, or Q, required.

A further advantage of the present invention as disclosed is that the digital nature of the implementation allows it to be effectively multiplexed, by sampling received signals discontinuously over several antenna faces thus encountering a type of interruption, or by sampling continuously with apparent concurrency over several discrete channels. For example, in the implementation described in this application, distinct parallel equipment including receivers, for each antenna face, would be required if the signal detection were done by phase lock loops.

A further advantage of the present invention is that by nature of the digital implementation under stored program control, parameters of the detection process such as selectivity may be dynamically altered in real time.

BRIEF DESCRIPTION OF THE DRAWING

FIGS. 5 through 9 are flow charts showing the various steps in the computation of supervisory audio tones.

DETAILED DESCRIPTION

Figure 1:
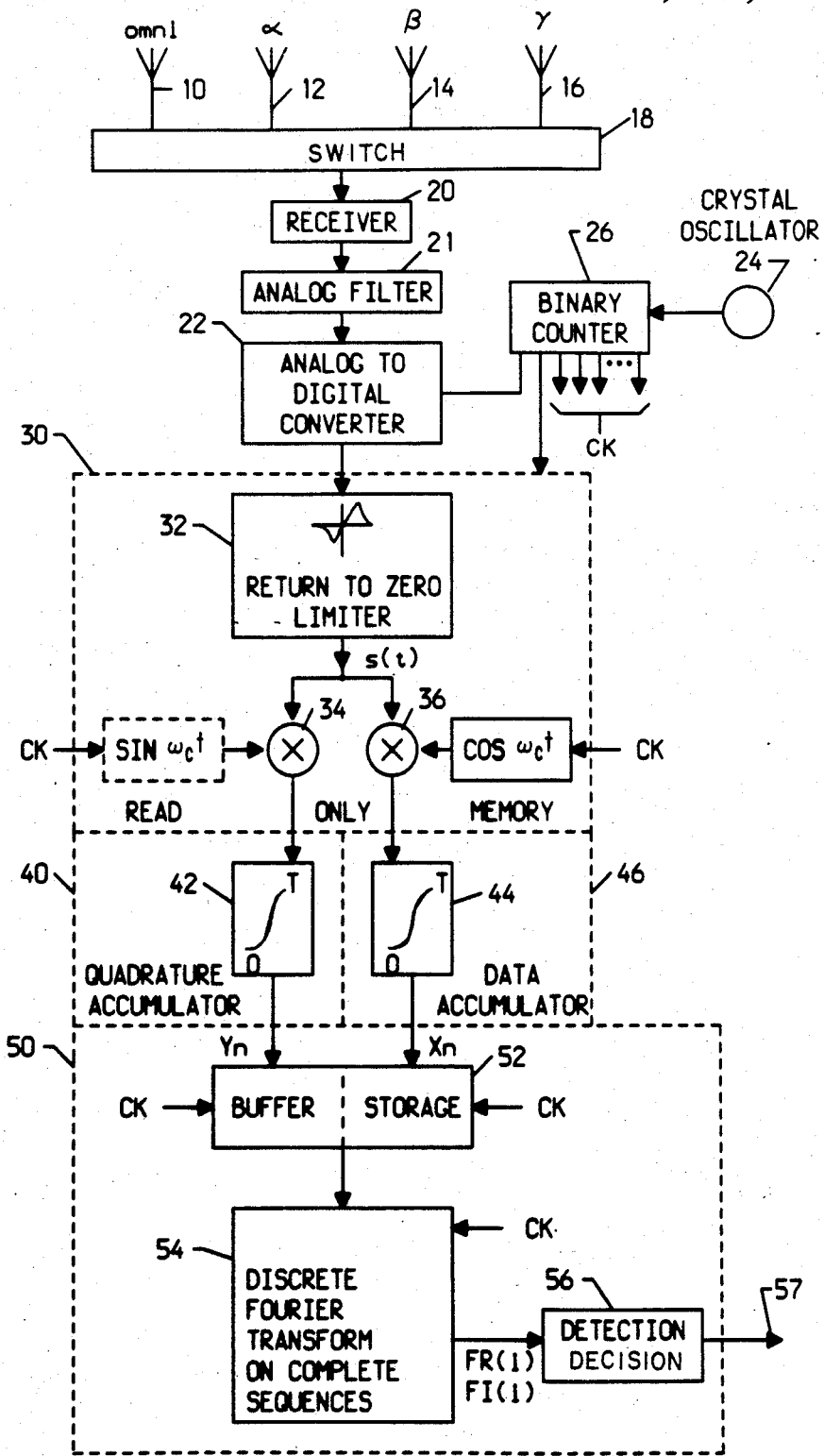
FIG. 1 is a block diagram of apparatus implementing the present invention.

Referring to FIG. 1, there is shown apparatus for receiving and detecting the presence of supervisory audio tones (SAT's) from a mobile unit. More particularly, omnidirectional antenna 10, and directional antennas 12, 14 and 16 receive signals from a mobile telephone unit (not shown). Although only four antennas are described, it is clear that this number may be changed. As stated in the background of this application, omnidirectional antennas are used to receive signals from all directions. But when a system grows, the omnidirectional antenna configuration is augmented by three directional antennas: alpha, beta, and gamma; each antenna serving a separate region of angular width 120 degrees. Switch 18 switches each of the aforesaid antennas in turn to receiver 20. After being filtered by element 21, analog signals are converted to digital signals in converter 22. A crystal oscillator 24 drives a binary counter 26 which provides clock signals at different synchronous subrates to the various elements and will not be described in detail because such technology is well known.

The digital signal from converter 22 is fed to a read only memory (ROM) 30 comprising limiter 32 for reducing spurious signals. Limiter 32 is a return to zero limiter of the type disclosed in a patent application having Ser. No. 497,228, filed May 23, 1983 by D. J. Thomson, one of the inventors of the present application which is now U.S. Pat. No. 4,596,024, issued on June 17, 1986.

The frequency of the received signal is extracted by conceptually feeding the output from limiter 32 to two multiplication circuits 34 and 36. Circuit 34 has two inputs: the output from limiter 32 and sin ($\omega_c t$), where $\omega_c = 2\pi f_c$ and $f_c$ is the frequency of the center SAT (6,000 Hz). Likewise, circuit 36 has two inputs: the output from limiter 32 and cos ($\omega_c t$). The output signals from circuit 34 are numerically integrated in element 42 of quadrature accumulator 40 and the output signals from circuit 36 are likewise numerically integrated in element 44 of data accumulator 46. The aforesaid signals from the multiplier circuits 34 and 36 are integrated over an interval from 0 to T (approximately one millisecond). That is, the first integrator 42, in cooperation with processor 50 performs a discrete approximation to the analog operation:

$$Y_k = \int_{T_k}^{T_k + T} s(t)\sin(\omega_c t)dt \tag{1}$$

and the second integrator 44, again cooperating with processor 50, likewise performs a discrete approximation to the analog operation:

$$X_k = \int_{T_k}^{T_k + T} s(t)\cos(\omega_c t)dt. \tag{2}$$

Each integral is over T seconds and is repeated every $T_k$ seconds. In the preferred embodiment the integration time T is approximately one millisecond and the time between integrations, $T_k$, is (66.6 over 8) milliseconds. Each of these integrals over T seconds comprises twelve subintegrals which are computed in hardware accumulators 42 and 44. The output signals from accumulators 42 and 44 are combined by processor 50 in the manner described hereinbelow. Each of these subintegrals comprise sixty-four samples and extend for one half-cycle of the 6 KHz signal, that is, for 1/12,000 of a second. Equivalently, each subintegral formed by summing sixty-four consecutive output signals from multipliers 34 and 36 at a spacing of 1/64×12,000 of a second, that is, 1.302 microseconds, and so have a duration of T/12 seconds. Twelve consecutive half-cycle results are combined in a manner described below to give the approximation to the integrals in equations (1) and (2). The two integrals of the sine and cosine products are combined to provide a complex number, as described hereinabove. These operations are repeated N times (N=8 in the preferred embodiment) to provide N complex numbers which are stored in buffer storage unit 52 of processor 50.

Next, a discrete Fourier transform (DFT) is done on the complex numbers in unit 54 of processor 50. The method of DFT is a well known process and may be found for example beginning at page 162 of a book entitled, "Digital Processing of Signals" by B. Gold and C. M. Rader, published by the McGraw-Hill Book Company. The DFT step yields N complext numbers. To determine the frequency of SAT, s(t), the frequency corresponding to the maximum F(i) is chosen for 0<=i<=N−1. Thereafter, in circuit 56, if the amplitude at the assigned frequency exceeds a threshold, a determination is made that the corresponding SAT has been detected. The method of calculating the maximum F(i) follows hereinbelow. The method is clearly not restricted to a single frequency and, for example, multiple SAT's could be assigned and amplitude and/or phase relations between them determined in a manner similar to that described herein.

The use of equations (1) and (2) for calculating the frequency of s(t) is explained by the reasoning hereinbelow. Consider the integral $$z_n + x_n + jy_n \tag{3}$$

$$= \int_{nT_k}^{nT_k + T} f(t)e^{-(j\omega_0 t)}dt$$

where,
T = the period of integration;

$$f(t) = e^{j(\omega_c + \omega_0)t + j\theta} \tag{4};$$

$\omega_c$ = center frequency; and
$\omega_0$ = offset frequency.
Thus, $$z_n = e^{j\theta} \int_{nT_k}^{nT_k + T} e^{(j\omega_c t)}dt \tag{5}$$

$$= Te^{j\theta}e^{j\omega_0 \frac{T}{2}} \frac{\sin\omega_0 \frac{T}{2}}{\omega_0 \frac{T}{2}} e^{j\omega_0 n T_k}$$

so that T, as defined above, acts as a scaling factor; the greater the T, the greater the sensitivity and selectivity;

$$e^{j\theta}e^{j\omega_0 \frac{T}{2}}$$

is a phase factor and is ignored in this frequency analysis; and $$\frac{\sin\omega_0 \frac{T}{2}}{\omega_0 \frac{T}{2}}$$

is a distortion factor. For a narrow channel, the distortion factor is approximately one, so that it can be neglected.
Thus, $$z_n \approx A e^{j\omega_0 n T_k} \tag{6}$$

where, A is a complex constant. Because $e^{j\omega_c t} = \cos \omega_c t + j \sin \omega_c t$, then $z_n$ can be evaluated by computing two integrals:

$$\int_{nT_k}^{nT_k + T} f(t)\cos(\omega_c t)dt \tag{7}$$

and $$\int_{nT_k}^{nT_k + T} f(t)\sin(\omega_c t)dt. \tag{8}$$

If this is repeated N times, N complex numbers can be obtained which correspond to N discrete points of $Ae^{j\omega_0 t}$, where each point is separated in time by $T_k$; that is:

$$A \exp j\omega_o 0\, T_k, \tag{9}$$

$$A \exp j\omega_o 1\, T_k,$$

$$A \exp j\omega_o 2\, T_k,$$

$$A \exp j\omega_o 3\, T_k,$$

$$A \exp j\omega_o (N-1)\, T_k.$$

The remaining problem is to determine $\omega_o$ by performing a DFT on the sequence of N complex points:

$$x_0+jy_0=z_0, z_1, z_2, \ldots, z_{N-1}.$$

As stated hereinabove, it is necessary to determine the maximum value of F(i). Values of F(i) are obtained by performing a DFT on the sequence of complex points which are described hereinbelow. The magnitude of F(i) is determined from the expression:

$$\sqrt{(\text{real } F(i))^2 + (\text{imag } F(i))^2}. \tag{10}$$

From computer simulation, it has been found that an effective approximation is:

$$|\text{real } F(i)| + |\text{imag } F(i)| \tag{11}$$

Figure 2:
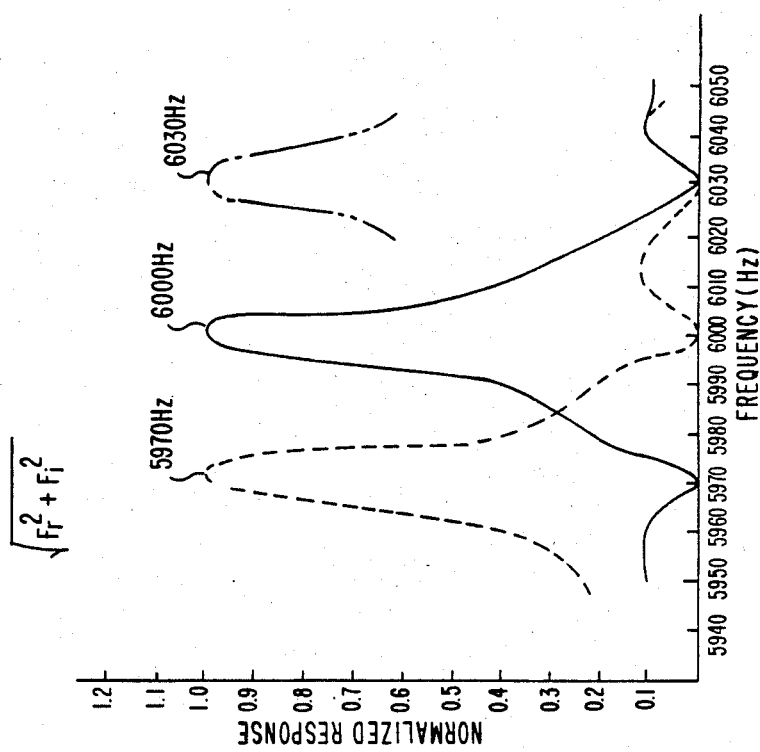
FIG. 2 is a graph of the expression $\sqrt{Fr^2 + Fi^2}$.
Figure 3:
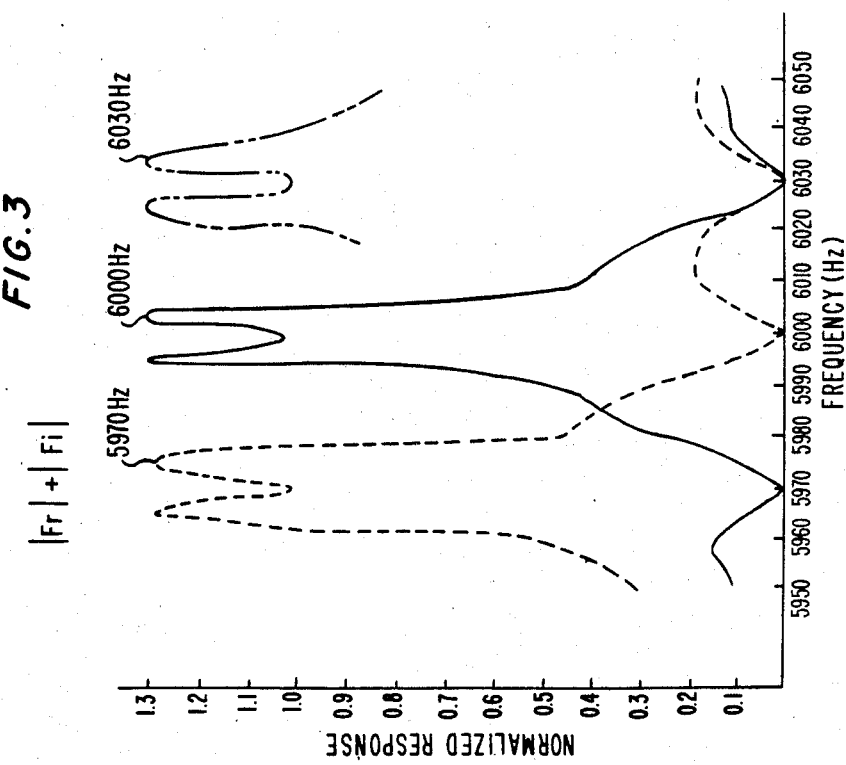
FIG. 3 is a graph of the expression $|Fr| + |Fi|$.

A comparison of a graph for equation (10), shown in FIG. 2, and a graph for equation (11), shown in FIG. 3, justifies the aforesaid approximation. The broader flattened peaks in FIG. 3 are advantageous in that mobile units have finite frequency tolerance.

The steps taken by processor 50 in computing the complex numbers received from quadrature accumulator 40 is shown in FIGS. 5 through 9. These steps are sufficiently detailed and are not repeated here. The goal is to determine eight complex numbers. The real component corresponds to the cos ($\omega t$) component and the imaginary part corresponds to the sin ($\omega t$) component. Each complex number is determined by entering numbers, the aforementioned subintegrals, from both data accumulator 40 and from quadrature accumulator 46 twelve times into corresponding processor registers. Each time a number is entered from aforesaid accumulators, it is either added to or subtracted from a running sum which is maintained in two corresponding processor data and quadrature registers.

Subtraction or addition is invoked depending upon whether an even or an odd half cycle is occurring. A lookup table located in an integrated circuit comprising the multiplier circuits 34 and 36 has half cycle information. In order to obtain information spanning a whole cycle, it is necessary to invert the sign of data from alternate half cycles. The use of lookup tables is well known and will not be further described.

After the eight numbers have been determined as stated hereinabove, a DFT is done. The following method is used:

$$FR(0) = x(0) + x(1) + x(2) + x(3) + x(4) + x(5) + x(6) + x(7) \tag{12}$$

$$FI(0) = y(0) + y(1) + y(2) + y(3) + y(4) + y(5) + y(6) + y(7) \tag{13}$$

-continued $$FR(2) = x(0) + y(1) - x(2) - y(3) + x(4) + y(5) - x(6) - y(7) \tag{14}$$

$$FI(2) = y(0) - x(1) - y(2) + x(3) + y(4) - x(5) - y(6) + x(7) \tag{15}$$

$$FR(6) = x(0) - y(1) - x(2) + y(3) + x(4) - y(5) - x(6) + y(7) \tag{16}$$

$$FI(6) = y(0) + x(1) - y(2) - x(3) + y(4) + x(5) - y(6) - x(7). \tag{17}$$

where, x(k) corresponds to the real part of the kth number;
y(k) corresponds to the imaginary part of the kth number;
FR(n) corresponds to the real part of the nth Fourier coefficient; and
FI(n) corresponds to the imaginary part of the nth Fourier coefficient.

These steps are derived from the definition of the DFT:

$$F(n) = \sum_{k=0}^{N-1} f(k) e^{-\frac{j2\pi nk}{N}}. \tag{18}$$

In this definition, n is taken mod N. That is, n=0 and n=N correspond as do the pairs n=−1 and n=N−1, n=−2 and n=N−2, and the like. For example, when N=8, n=−2 and n=6 are equivalent. Thus, the FR(6) and FI(6) of equations (16) and (17), respectively, supply the information required for m=−2 in equation (32), hereinbelow.

In the preferred embodiment there are only three SAT's to be computed: 5,970 Hz; 6,000 Hz; and 6,030 Hz. Therefore, there are only three Fourier coefficients to be calculated: corresponding to the 6,000 Hz SAT $$FR(0)+jFI(0) \tag{19};$$

corresponding to the 6,030 Hz SAT $$FR(2)+jFI(2) \tag{20};$$

and corresponding to the 5,970 Hz SAT $$FR(6)+jFI(6) \tag{21}.$$

Because of the aforesaid approximation, the following expressions are evaluated:

$$|FR(0)|+|FI(0)| \tag{22};$$

$$|FR(2)|+|FI(2)| \tag{23};$$

and $$|FR(6)|+|FI(6)| \tag{24}).$$

If any of these sums exceeds a threshold, the corresponding SAT is determined to be present.

After the decision has been made in circuit 56 as stated hereinabove, the output is sent over path 57 to a cell site controller (not shown). After the decision has been made for the omnidirectional antenna, the aforesaid steps are repeated for each of the three directional antennas. Note, however, that this does not imply that measurements and decisions for four antennas requires four times the time required for one. Using the referred values of T=1 mS and $T_k$=66.6/8=$\approx$8 mS. one can perform measurements on the omni antenna for 1 mS, then switch immediately to the $\alpha$ face. Allowing about one mS for the receiver IF filter to settle from the change in level, one then makes the 1 mS integration on the $\alpha$ face. Continuing thus through $\beta$ and $\gamma$ one completes the cycle and is ready to begin the subsequent integration on the omni face with a delay of $T_k$ about 8 mS from the previous integration. Thus, the total measurement time for all four antennas requires only 7 mS more than the time needed for a single antenna.

Each SAT must be detected within a period L given by the expression:

$$M/\Delta f \quad (25)$$

where $\Delta f$=30 Hz, the frequency difference between two SAT's; and

M=2, an integer.

Figure 4:
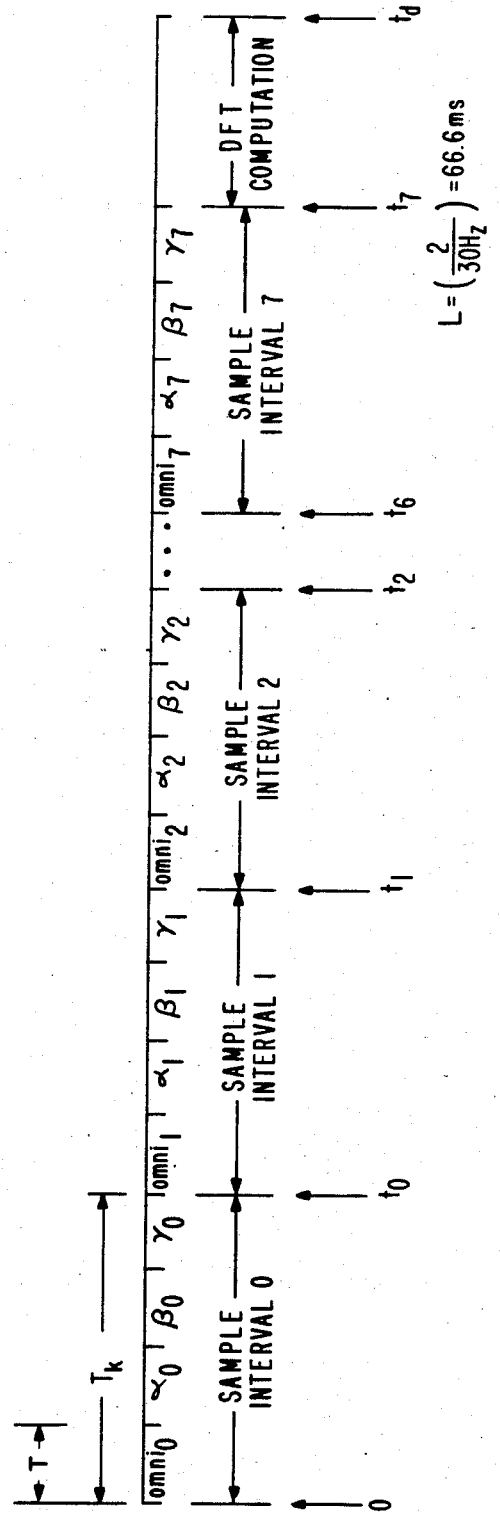
FIG. 4 is a line drawing showing the various computations to be done within a predetermined period to determine a supervisory audio tone.
Figure 5:
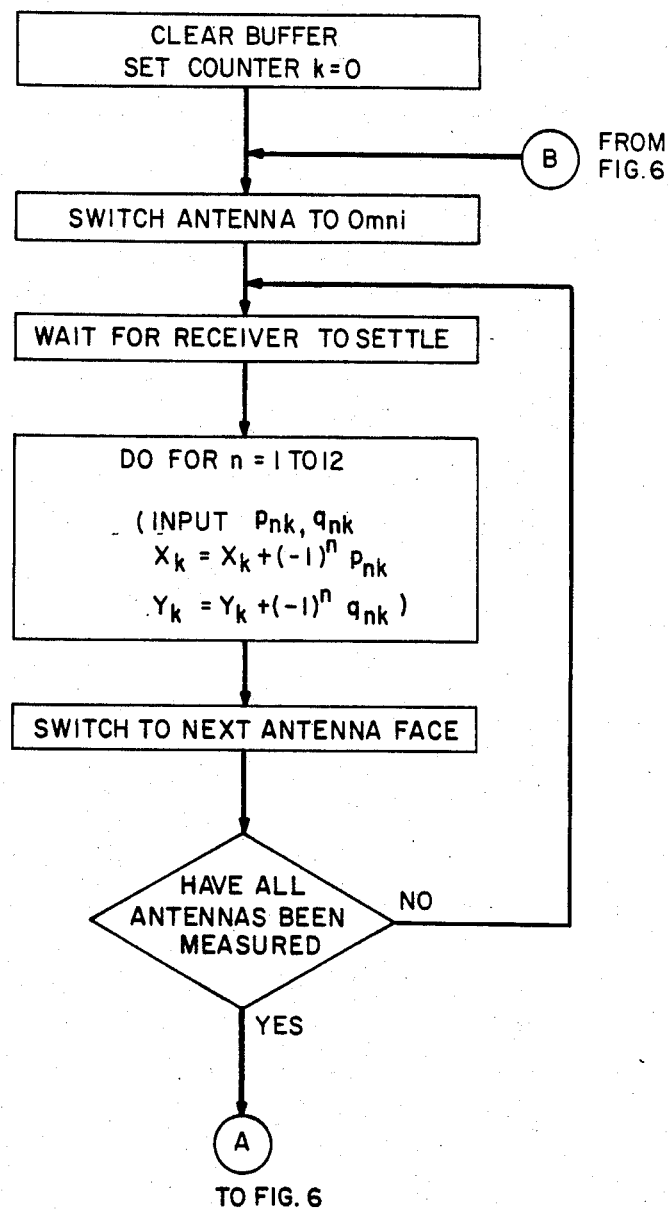
Figure 6:
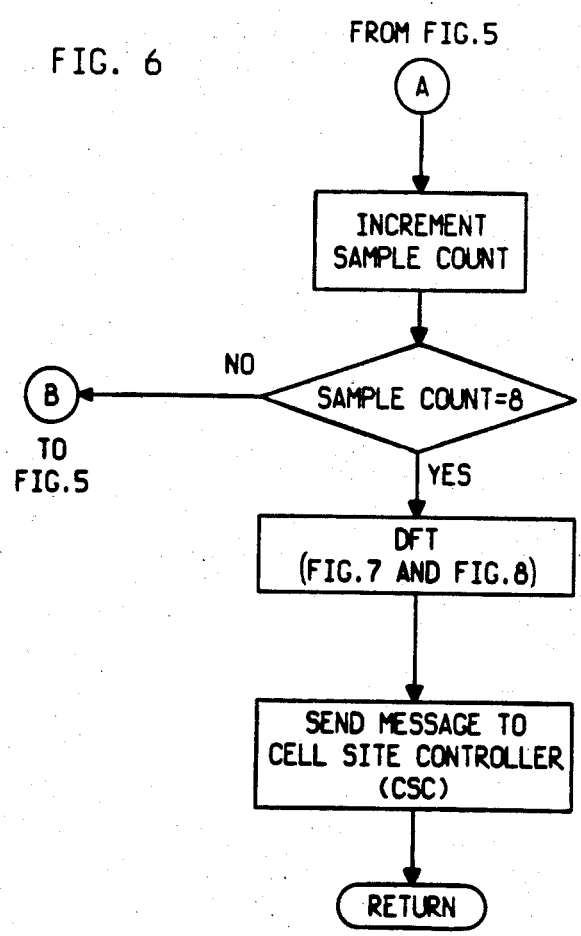
Figure 7:
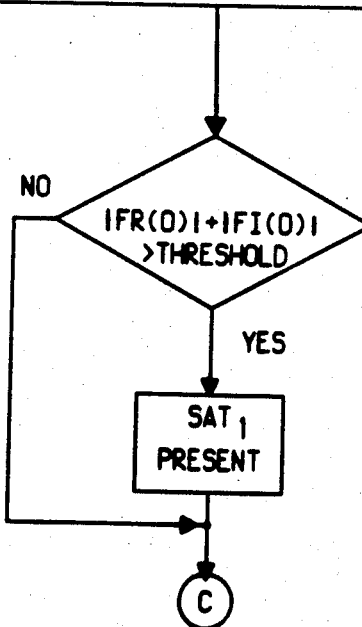
Figure 8:
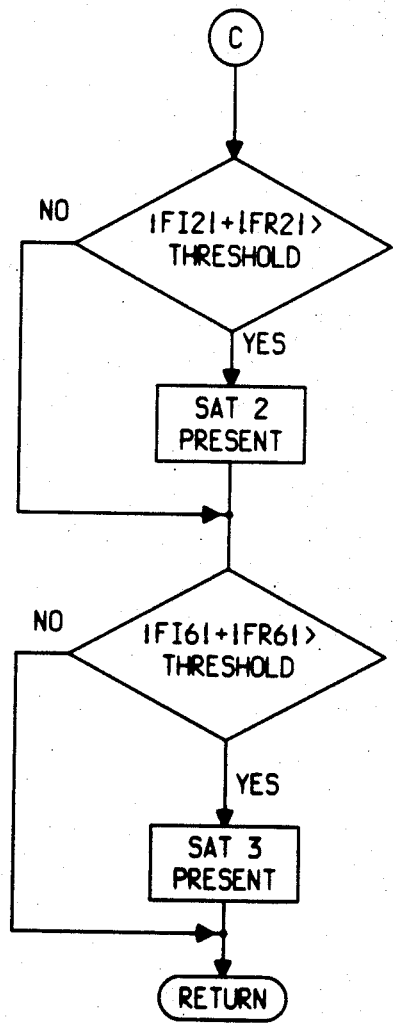

Substituting the values for M and $\Delta f$ and simplifying, the value of 66.6 milliseconds for L is obtained. Thus, the SAT measurements must be done within a period, approximately sixty-seven milliseconds. The computations can be done either concurrently or subsequently, as required. This can be understood by referring to FIG. 4.

Each of the aforesaid complex numbered samples is maintained as thirty-two bits; sixteen bits by way of the real part and sixteen bits by way of the imaginary part. The real part $x_k$ is given by $$x_k = \sum_{n=1}^{12} p_{nk}(-1)^n \text{ and;} \quad (26)$$

the imaginary part $y_k$ is given by $$y_k = \sum_{n=1}^{12} q_{nk}(-1)^n, \quad (27)$$

where, $p_{nk}$ is the nth sample from data accumulator 46, and $q_{nk}$ is the nth sample from the quadrature accumulator 40 during the kth time interval. Each of the p's and q's is the sum of sixty-four products of s(t) with cosine computed in data accumulator 46 and sixty-four products of s(t) with sine computed in quadrature accumulator 40 over the same half cycle of the 6 KHz clock.

The DFT is defined by the expression:

$$z_m = \sum_{k=0}^{7} (x_k + iy_k)e^{-\frac{i2\pi km}{8}}. \quad (28)$$

The frequencies, $f_m$, of $z_m$ is given by the expression:

$$f_m = f_{center} + \frac{m}{8\,T_k}; \quad (29)$$

where, the sampling time $T_k = \frac{66.6\ ms}{8}$; (30)

the center frequency, $f_{center}$ = 6,000 Hz; (31)

m = 0, 2, or −2; and

-continued $$f_m = 6,000 + \frac{m}{\frac{8 \times 66.6}{8}}. \quad (32)$$

Simplifying, the frequencies are:
for m=−2, $f_m$=5,970 Hz;
for m=0, $f_m$=6,000 Hz; and
for m=2, $f_m$=6,030 Hz.

If any of the $z_m$ corresponding to each of these $f_m$ frequencies is larger than a threshold, then the corresponding SAT is declared to be present.

A listing of the computer programs for the aforesaid steps is included in an appendix to this application.

Figure 10:
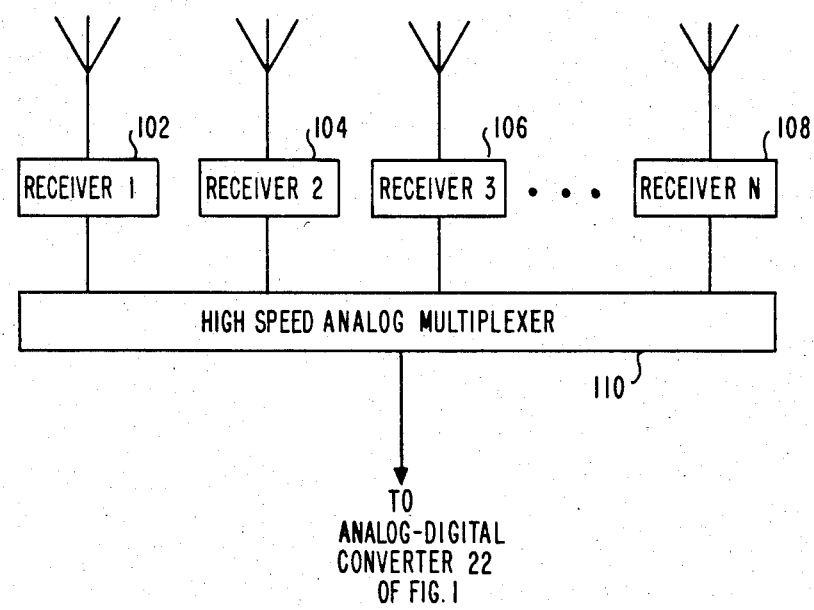
FIG. 10 is a block diagram of another apparatus implementation of the present invention.

Referring to FIG. 10, there is shown apparatus for concurrently monitoring SAT on a plurality of active voice channels. In this embodiment, separate receivers exist for each channel and are not switched at the antennas so that there is not the problem of waiting for receiver settling time as in the previously described embodiment. Thus, there are a plurality of channel receivers 102, 104, 106 . . . 108, each sampled sequentially and repetitively.

High speed analog multiplexor 110 is placed advantageously at the output of each receiver and interleaved samples taken for each channel at a rate, typically, 48 KHz. The output from multiplexor 110 is fed to an analog-to-digital converter, such as element 22 in FIG. 1, the rest of the circuit remaining the same.

The data and quad accumulators are partitioned according to the original signal source or channel and serve as multiplexed integrators serving multiple channels. By replacing the single latch in the accumulator with one for each channel being monitored and switching latches synchronously with the channel multiplexor one may have effectively T=$T_k$ on all channels with the attendant gain in sensitivity.

Subsequent data and quadrature processing proceeds concurrently for all channels. By interleaving the individual channel samples, all channels may be processed in parallel and results for all channels will be available at the same time in individual buffers for each channel.

In addition to its use in mobile radio telephony, the aforesaid method of signal detection can be used in related fields where signal detection in the presence of noise is a major consideration.

What is claimed is:

1. A method for detecting the presence of one of a plurality of supervisory audio tones (SAT) associated with a channel comprising the steps of
    (a) receiving said tone,
    (b) converting said tone from analog to digital form,
    (c) reducing spurious signals,
    (d) bifurcating said tone into first and second paths,
    (e) multiplying said tone in said first path by a cosine function and integrating over a predetermined time interval to obtain a real component of a complex number,
    (f) multiplying said tone in said second path by a sine function and integrating to obtain an imaginary component of said complex number,
    (g) repeating steps (a) through (f) over a number of sequential but not necessarily contiguous time intervals to obtain a plurality of said complex numbers,
    (h) finding a maximum absolute amplitude among a plurality of frequencies by performing a discrete Fourier transform on said complex numbers, (i) comparing said maximum amplitude with a threshold, and (j) declaring the presence of a SAT when said maximum amplitude exceeds said threshold.

2. The method of claim 1 further comprising the step of detecting said supervisory audio tone within a predetermined period.

3. The method of claim 2 wherein said period is defined by an expression $2/\delta f$, where $\delta f$ is the difference in frequency between any two adjacent supervisory audio tones.

4. Apparatus for detecting the presence of one of a plurality of supervisory audio tones (SAT) associated with a channel, said apparatus comprising means for receiving said tone, means for converting said tone from analog to digital form, means for reducing spurious signals, means for bifurcating said tone into first and second paths, means for multiplying said tone in said first path by a cosine function and summing over a predetermined number of samples at predetermined times to obtain a real component of a complex number, means for multiplying said tone in said second path by a sine function and concurrently summing to obtain an imaginary component of said complex number, the aforesaid means being operated repeatedly to obtain a sequence of said complex numbers, means for finding a maximum amplitude among a plurality of frequencies by performing a discrete Fourier transform on said complex numbers, means for comparing said maximum amplitude with a threshold, and means for delcaring the presence of a SAT when said maximum amplitude exceeds said threshold.

5. A method for detecting the presence of one of a plurality of supervisory audio tones (SAT) associated with each of a plurality of channels comprising the steps of (a) receiving said tones at each of a plurality of channel receivers concurrently, (b) sampling said tones in each of said receivers sequentially and repetitively, (c) converting each of said tones from analog-to-digital form, (d) reducing spurious signals, (e) bifurcating said tones into first and second paths, (f) multiplying said tones in said first path by a cosine function and integrating over a predetermined time interval to obtain a real component of a complex number, (g) multiplying said tones in said second path by a sine function and integrating to obtain an imaginary component of said complex number, (h) repeating steps (a) through (g) successively and consecutively for a predetermined number of times to obtain a plurality of said complex numbers for each of said channels, (i) finding a maximum absolute amplitude among a plurality of frequencies by performing a discrete Fourier transform on said complex numbers for each of said channels, (j) comparing said maximum amplitude with a threshold for each channel, and (k) declaring the presence of a SAT when said maximum amplitude exceeds said threshold for each channel.

6. The method of claim 5 further comprising the step of detecting said supervisory audio tone within a predetermined period.

7. The method of claim 6 wherein said period is defined by an expression $2/\delta f$, where $\delta f$ is the difference in frequency between any two adjacent supervisory audio tones.

8. Apparatus for detecting the presence of one of a plurality of supervisory audio tones (SAT) associated with each of a plurality of channels, said apparatus comprising a plurality of receiving means, each receiver means connected to one of said channels for receiving one of said tones thereat, means for sampling each of said tones from each of said receiver means sequentially and repetitively, means for converting each of said tones from analog-to-digital form, means for reducing spurious signals, means for bifurcating each of said tones into first and second paths, means for multiplying each of said tones in said first path by a cosine function and summing over a fixed number of samples to obtain a real component of a complex number, means for multiplying each of said tones in said second path by a sine function and summing to obtain an imaginary component of said complex number, said means being operated sequentially and repetitively to obtain a plurality of said complex numbers concurrently for each of said channels, means for finding a maximum amplitude among a plurality of frequencies by performing a discrete Fourier transform on said complex numbers for each of said channels, means for comparing said maximum amplitude with a threshold for each of said channels, and means for declaring the presence of a SAT when said maximum amplitude exceeds said threshold for a given channel.

* * * * *